(12) United States Patent
Lawson

(10) Patent No.: US 10,390,621 B2
(45) Date of Patent: Aug. 27, 2019

(54) MODULAR ASSEMBLY FOR HIGH LEG ROW SEATING

(71) Applicant: L&P PROPERTY MANAGEMENT COMPANY, South Gate, CA (US)

(72) Inventor: Gregory Mark Lawson, Tupelo, MS (US)

(73) Assignee: L&P PROPERTY MANAGEMENT COMPANY, South Gate, CA (US)

( * ) Notice: Subject to any disclaimer, the term of this patent is extended or adjusted under 35 U.S.C. 154(b) by 12 days.

(21) Appl. No.: 15/595,522

(22) Filed: May 15, 2017

(65) Prior Publication Data

US 2018/0242746 A1  Aug. 30, 2018

Related U.S. Application Data

(63) Continuation-in-part of application No. 15/441,984, filed on Feb. 24, 2017.

(51) Int. Cl.
| | |
|---|---|
| A47C 1/12 | (2006.01) |
| A47C 1/124 | (2006.01) |
| A47C 1/0355 | (2013.01) |
| B64D 11/06 | (2006.01) |
| A47C 1/034 | (2006.01) |

(52) U.S. Cl.
CPC .............. *A47C 1/12* (2013.01); *A47C 1/0355* (2013.01); *A47C 1/124* (2013.01); *A47C 1/0342* (2013.01); *B64D 11/0639* (2014.12)

(58) Field of Classification Search
CPC ................................. A47C 1/0355; A47C 1/12
USPC ............................................. 297/440.14, 248
See application file for complete search history.

(56) References Cited

U.S. PATENT DOCUMENTS

| | | |
|---|---|---|
| 3,135,548 A | 6/1964 | Fletcher et al. |
| 3,302,969 A | 2/1967 | Mizelle et al. |
| 4,765,678 A | 8/1988 | Huang |
| 4,790,594 A | 12/1988 | Temos |
| 5,013,084 A | 5/1991 | May |
| 5,129,703 A | 7/1992 | Ballendat et al. |
| 5,435,621 A | 7/1995 | Komorowski et al. |
| 5,653,507 A | 8/1997 | Moore |
| 6,145,924 A | 11/2000 | Mero, Jr. et al. |
| 6,688,699 B1 * | 2/2004 | Bowie ............... A47C 4/021 297/440.14 |

(Continued)

FOREIGN PATENT DOCUMENTS

EP  1796512 B1  2/2009

OTHER PUBLICATIONS

PCT Search Report dated Mar. 13, 2018 in PCT Patent Application No. PCT/US17/68432, 7 pages.

(Continued)

*Primary Examiner* — Anthony D Barfield
(74) *Attorney, Agent, or Firm* — Shook, Hardy & Bacon L.L.P.

(57) ABSTRACT

A modular base system is provided that allows easy installation and maintenance in a row of motion seating units. Arms are easily removable from a base assembly. The base assembly also provides structure allowing easy installation and removal of the motion mechanism. The base assembly also allows easy installation and removal of a back panel. The motion mechanism includes a pivotal seat frame attachment allowing the seat to be pivoted upwardly, from the front of the mechanism.

20 Claims, 22 Drawing Sheets

(56) References Cited

U.S. PATENT DOCUMENTS

| | | | |
|---|---|---|---|
| 8,419,122 B2 | 4/2013 | Lawson et al. | |
| 8,950,817 B2 * | 2/2015 | Iacovoni | A47B 83/02 |
| | | | 297/452.18 |
| 9,241,571 B2 * | 1/2016 | Robertson | |
| 2003/0011231 A1 | 1/2003 | Guillot | |
| 2011/0248545 A1 | 10/2011 | Lapointe et al. | |
| 2013/0240688 A1 | 9/2013 | Schwartz et al. | |
| 2014/0292052 A1 | 10/2014 | Parker et al. | |
| 2016/0029800 A1 | 2/2016 | Bryant | |
| 2016/0270537 A1 | 9/2016 | Marshall et al. | |
| 2017/0347797 A1 | 12/2017 | Robertson | |

OTHER PUBLICATIONS

International Search Report and Written Opinion dated Nov. 16, 2018 in International Patent Application No. PCT/US18/56646, 7 pages.
Non-Final Office Action dated Oct. 5, 2018 in U.S. Appl. No. 15/441,984, 6 pages.
Notice of Allowance dated Oct. 9, 2018 in U.S. Appl. No. 15/793,992, 8 pages.
Non-Final Office Action dated Apr. 4, 2019 in U.S. Appl. No. 15/953,578, 6 pages.
Notice of Allowance dated Apr. 9, 2019 in U.S. Appl. No. 15/441,984, 5 pages.

* cited by examiner

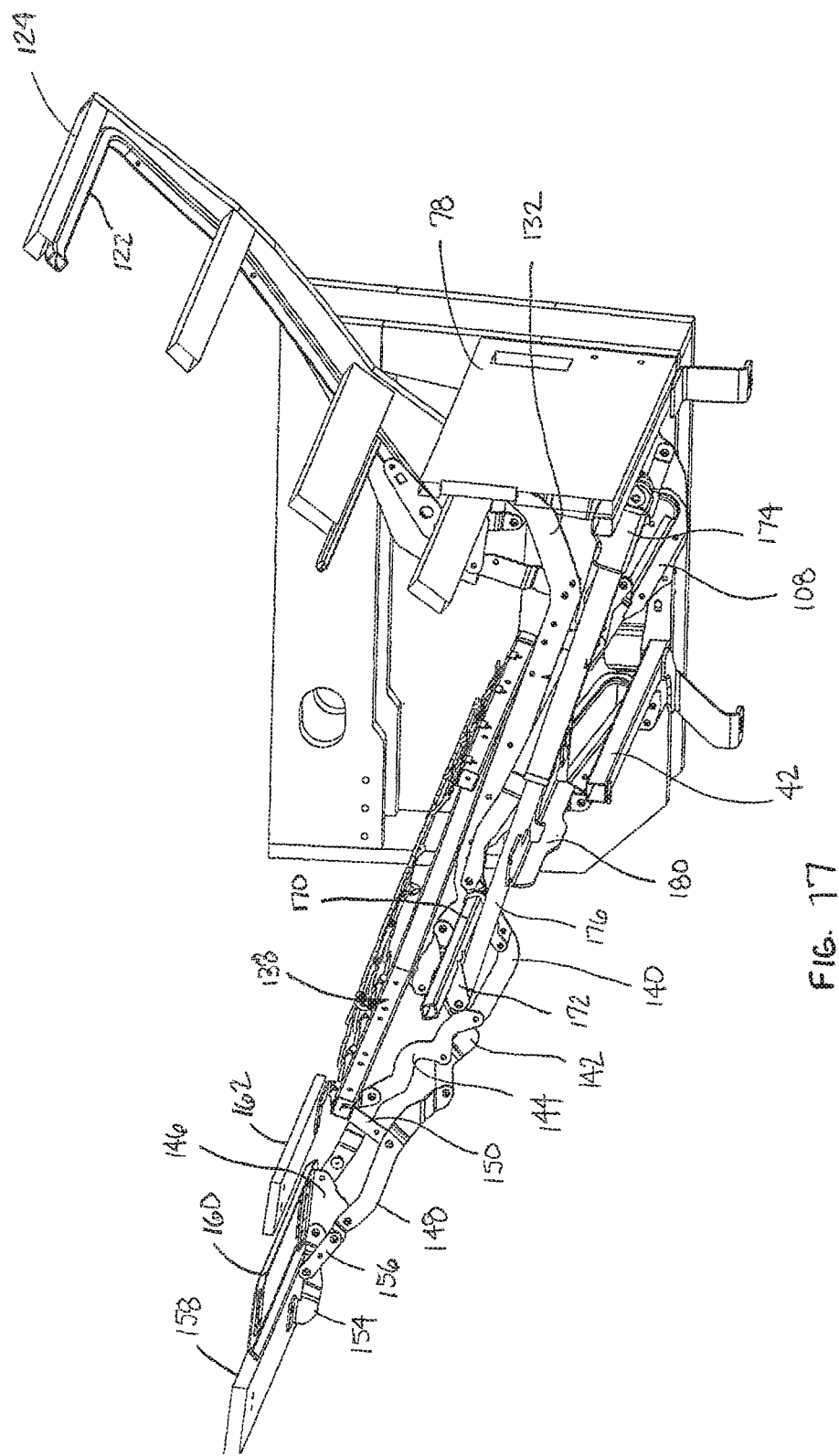

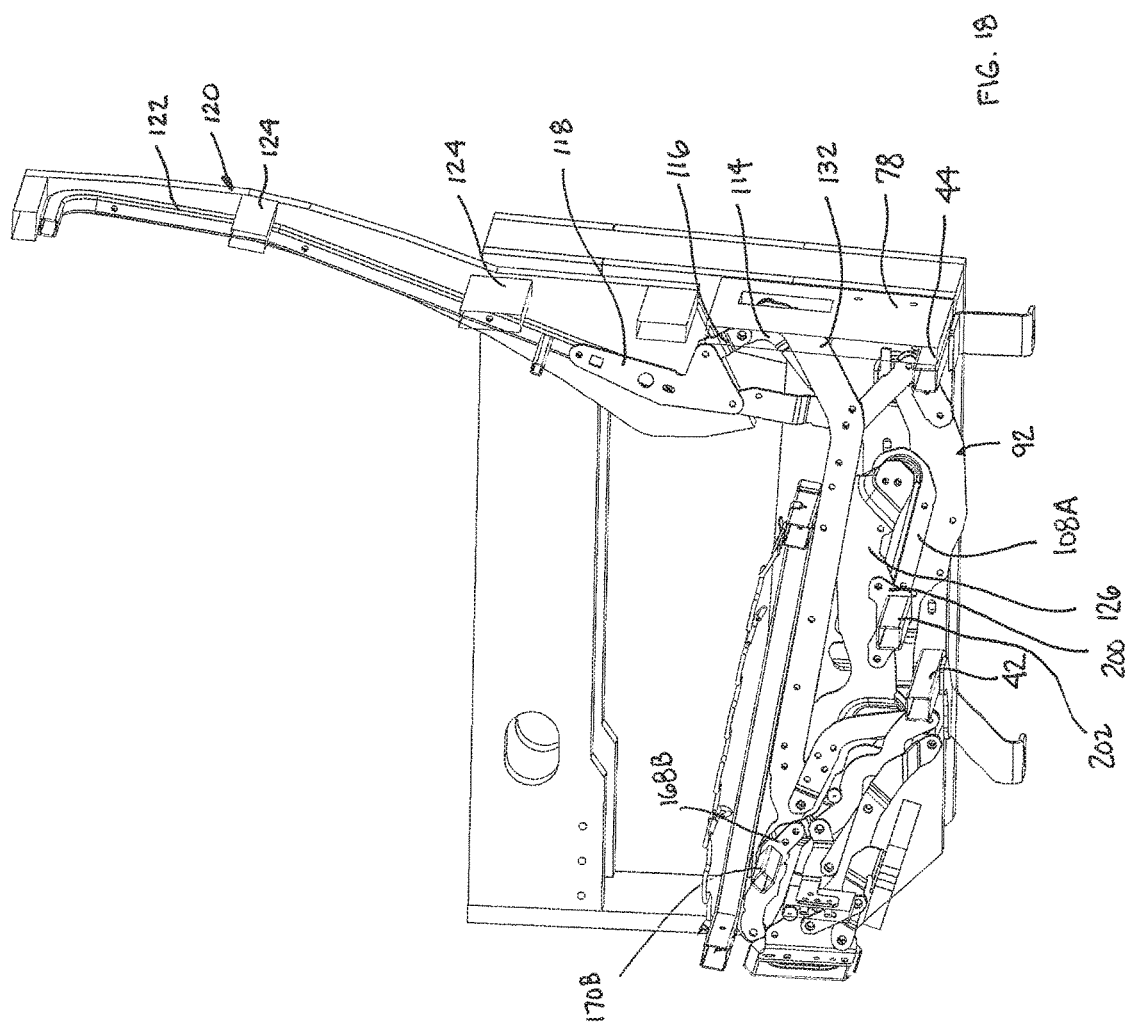

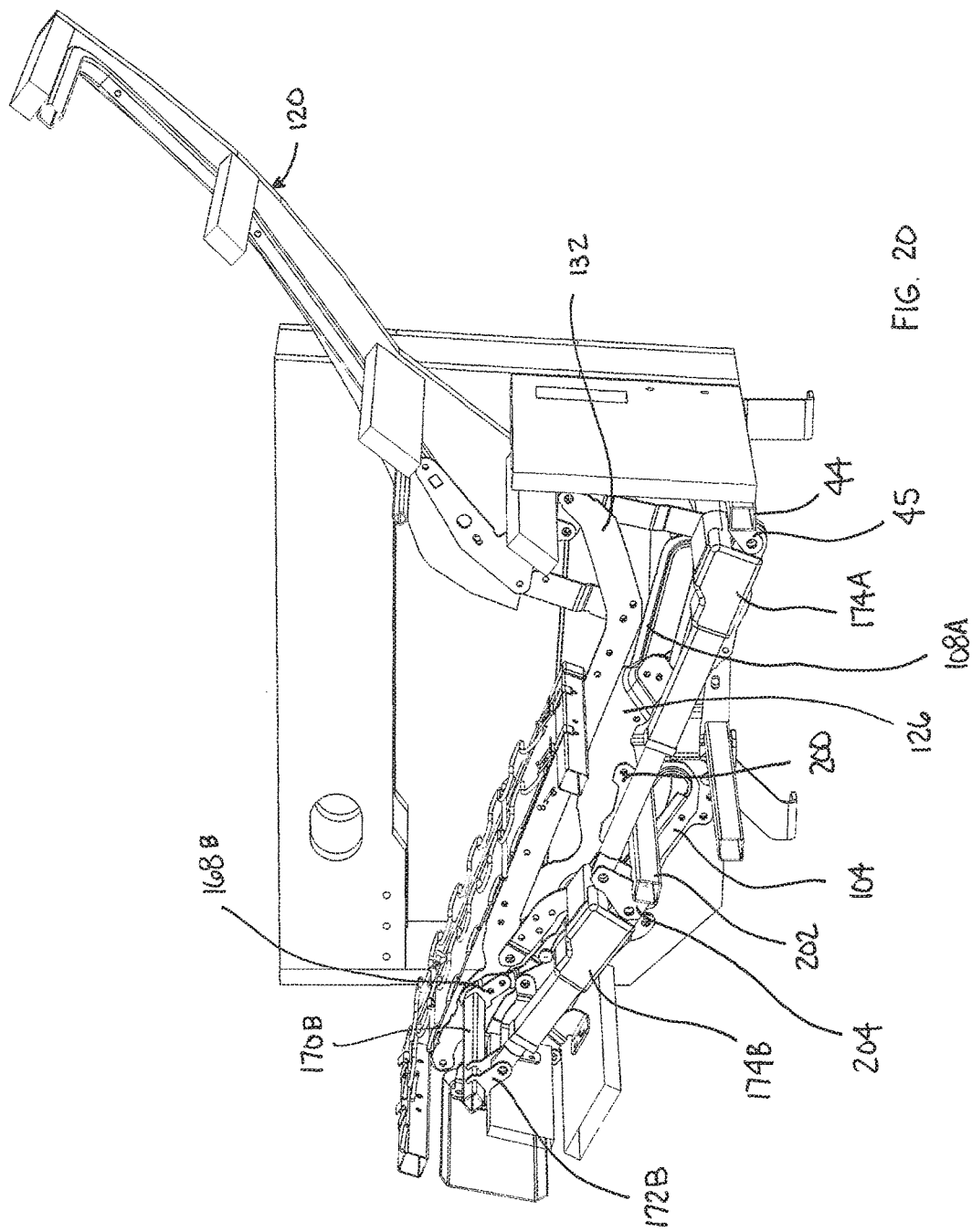

MODULAR ASSEMBLY FOR HIGH LEG ROW SEATING

CROSS-REFERENCE TO RELATED APPLICATIONS

This application is continuation-in-part of and claims the benefit of priority to U.S. application Ser. No. 15/441,984, filed Feb. 24, 2017, priority from the filing date of which is hereby claimed, and which is herein incorporated by reference.

STATEMENT REGARDING FEDERALLY SPONSORED RESEARCH OR DEVELOPMENT

Not applicable.

TECHNICAL FIELD

Embodiments of the present invention relate to high leg seating arrangements, and particularly to row seating in an environment with row seating.

BACKGROUND OF THE INVENTION

In the motion furniture industry, mechanisms exist to move a chair between at least three positions: a closed position, with a footrest stowed and the chair back substantially upright; a TV or extended position, with the footrest extended and the back slightly reclined; and a fully reclined position with the footrest extended and the back reclined. This type of motion is now making its way into other environments, such as movie theaters or cinemas. However, these commercial environments present new problems for this type of motion furniture. It would be advantageous to have a design adapted for the challenges presented by these environments.

BRIEF DESCRIPTION OF THE INVENTION

An assembly is provided that includes a modular base system useable in a row of motion furniture seating, such as in theaters. The modular base system can be directly bolted to a floor, and may be equipped with adjustable legs to allow the unit to be leveled to accommodate uneven flooring. The modular base system provides structure allowing easy removal and replacement of the arms, back panels, and the linkage mechanism used to move the seating unit between closed, extended, and fully reclined positions. Structure is also provided allowing the seat to be pivoted upwardly to expose the interior of the seating unit, such as might be needed for repair or cleaning. Additionally, a low-profile, formed, metal footrest plate is provided that allows a wrap-around chaise pad to easily slide over the footrest as the footrest opens and closes. A slim profile chair back assembly is also provided that includes an easily removable chair back as well. The mechanism of the seating unit drives a seat pitch change from the closed to the extended position, and from the extended to the fully reclined position, increasing comfort and minimizing the space required between rows of seating units.

Additional objects, advantages, and novel features of the invention will be set forth in part in the description that follows, and in part will become apparent to those skilled in the art upon examination of the following, or may be learned by practice of the invention.

BRIEF DESCRIPTION OF SEVERAL VIEWS OF THE DRAWINGS

The present invention is described in detail below with reference to the attached drawing figures, wherein:

FIGS. 11-17 are cross-sections of the fully reclined position of FIG. 7 (from a different angle) progressively moving from the arm of the seating unit towards the center of the seating unit, to show details of construction, particularly of the mechanism;

FIG. 18 is a cross-section of a different aspect of the invention, shown in the closed position;

FIG. 19 is a view similar to FIG. 18, but showing the back reclined, with the footrest closed;

FIG. 20 is a view similar to FIG. 19, along a different cross-section to reveal additional components;

DETAILED DESCRIPTION OF THE INVENTION

Embodiments of the present invention generally relate to an assembly that provides a modular base system useable in a row of motion furniture seating, such as in theaters. The modular base system can be directly bolted to a floor, and may be equipped with adjustable legs to allow the unit to be leveled to accommodate uneven flooring. The modular base system provides structure allowing easy removal and replacement of the arms, back panels, and the linkage mechanism used to move the seating unit between closed, extended, and fully reclined positions. Structure is also provided allowing the seat to be pivoted upwardly to expose the interior of the seating unit, such as might be needed for repair or cleaning. Additionally, a low-profiled, formed, metal footrest plate is provided that allows a wraparound chaise pad to easily slide over the footrest as the footrest opens and closes. A slim profile chair back assembly is also provided that includes an easily removable chair back as well. The mechanism of the seating unit drives a seat pitch change from the closed to the extended position, and from the extended to the fully reclined position, increasing comfort and minimizing the space required between rows of seating units.

Figure 1:
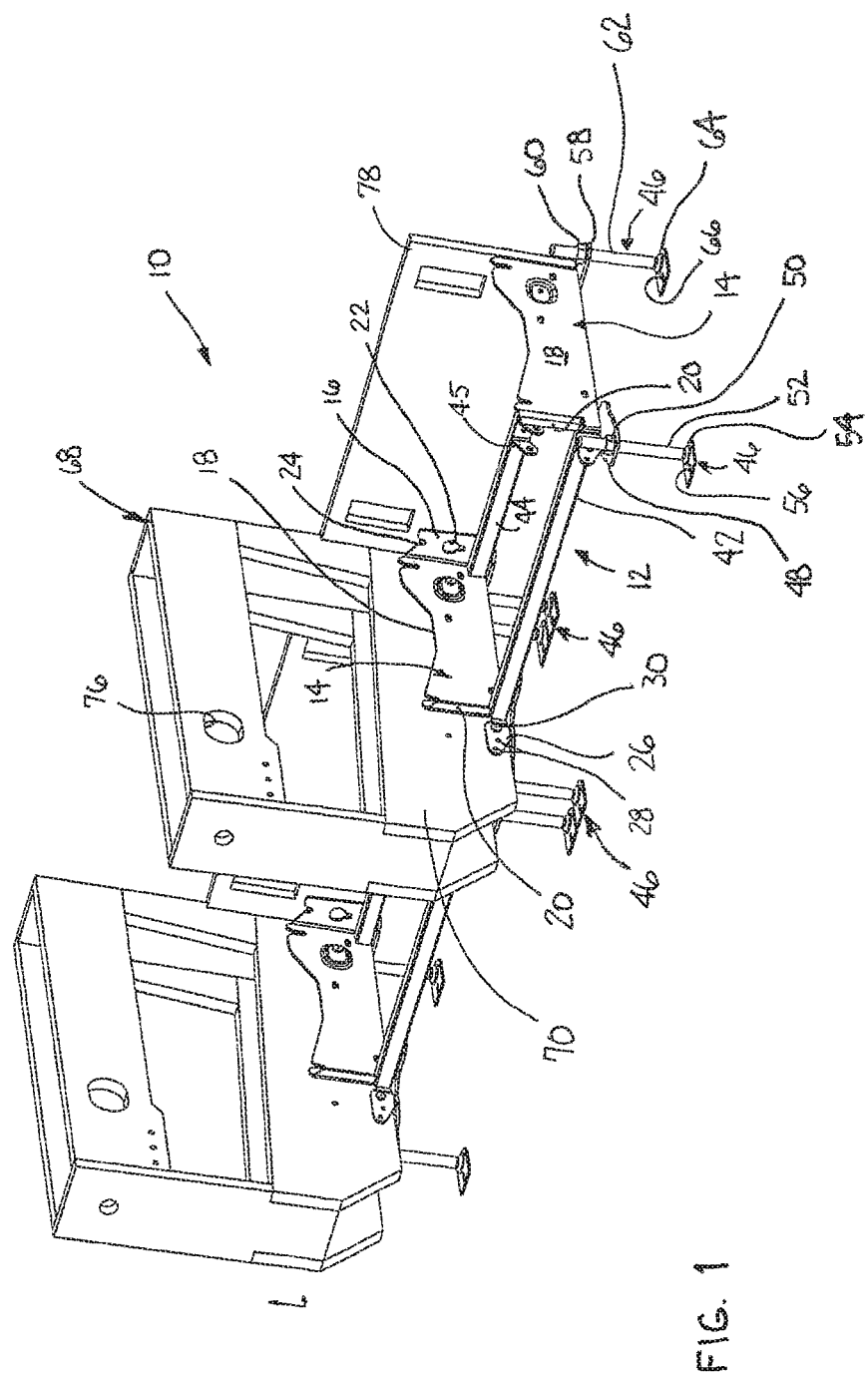
FIG. 1 is a perspective view of an exemplary multiple chassis modular base system, showing two base assemblies and two arms, and two back panels, without showing the remainder of the seating unit, for clarity, in accordance with an embodiment of the invention.
Figure 2:
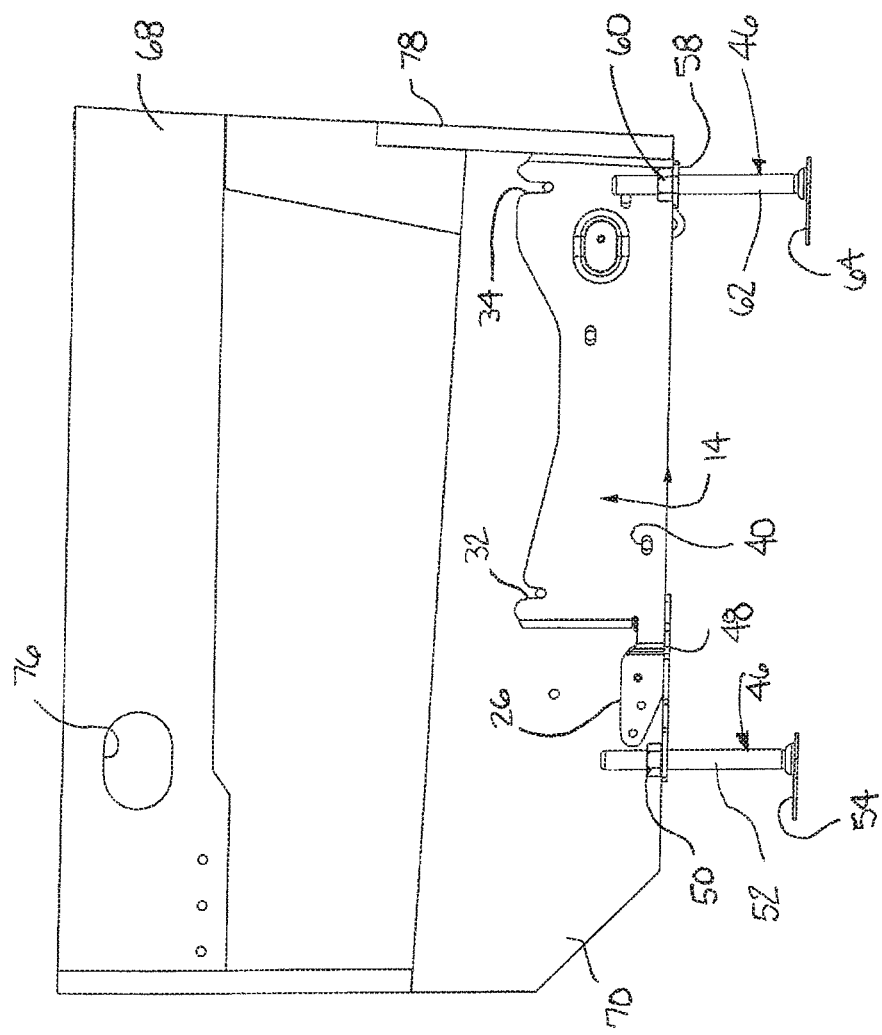
FIG. 2 is a side view of FIG. 1.
Figure 3:
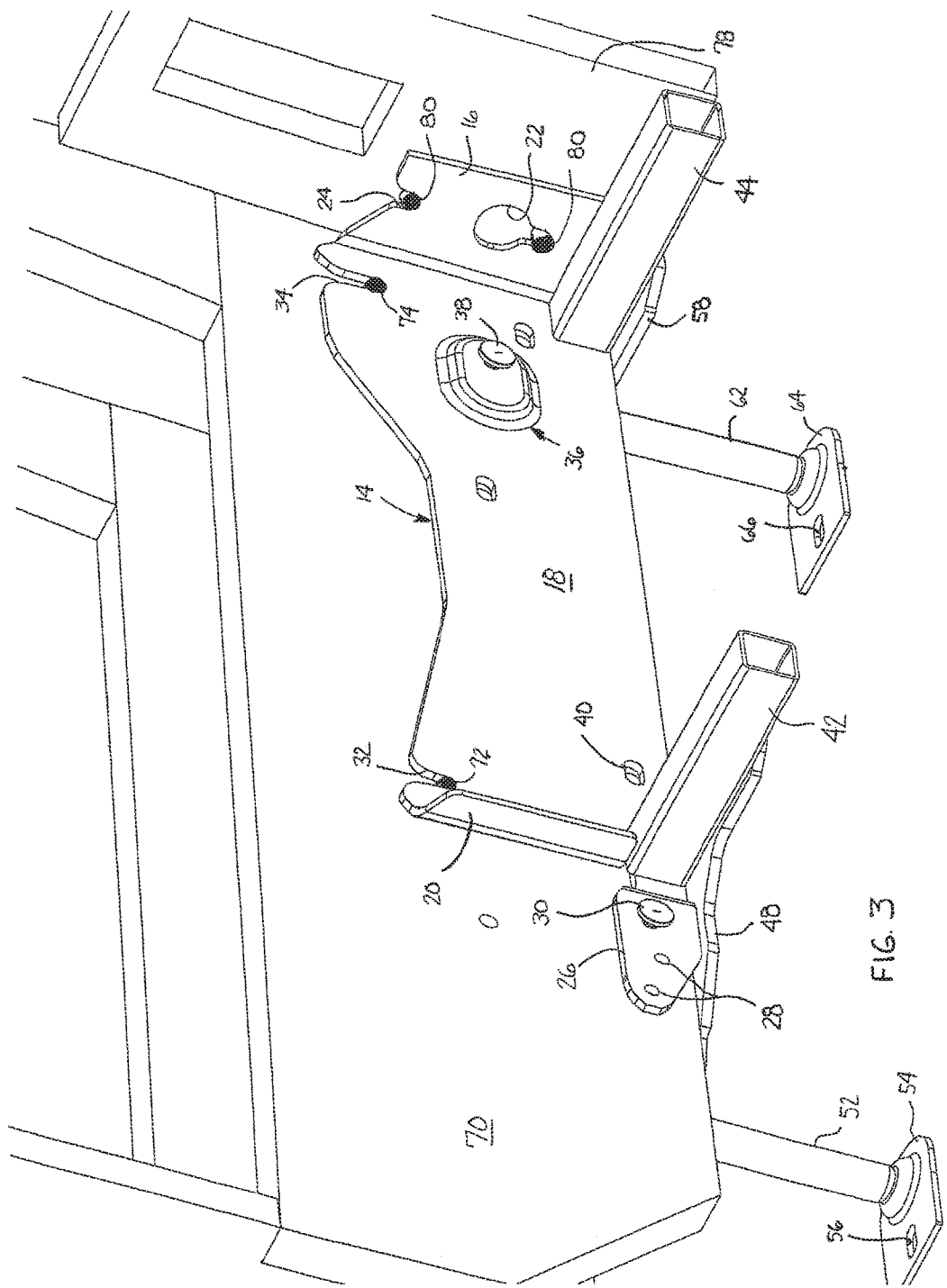
FIG. 3 is an enlarged, partial perspective view of a portion of the system of FIG. 1.

A modular base system 10 is shown in FIG. 1, with certain parts removed, for clarity. Moreover, while FIG. 1 illustrates only a partial row, it should be understood that a row of seating could be constructed by adding to the arrangement shown. Modular base system 10 includes a number of spaced apart, welded base assemblies 12, only one of which is labeled in detail, it being understood that each base assembly 12 is similarly constructed. Base assembly 12 includes two spaced apart chassis plates 14, each a mirror image of the other. Each chassis plate 14 has a rear panel 16, a side panel 18, and a front stiffening flange 20. While the rear panel 16, side panel 18, and front stiffening flange 20 are preferably formed from one piece of metal, the assembly could also be made from separate parts and then combined together, such as by welding. As best seen in FIG. 3, rear panel 16 has a keyhole slot 22 formed therein, and a top slot 24 extending downwardly from a top surface. Side panel 18 extends from rear panel 16 to front stiffening flange 20, and beyond stiffening flange 20 to a front mechanism bracket 26. The front mechanism bracket 26 includes one or more mounting holes 28 along with an inwardly extending mechanism pin 30. The mechanism pin 30 may have a head that is larger than a base portion, forming a space between the head and the surface of the front mechanism bracket 26. As shown, the front mechanism bracket 26 may be formed with an inward offset, such that it is offset inwardly from the remainder of side panel 18. As best seen in FIG. 3, just rearwardly of the front stiffening flange 20, the side panel 18 has a front slot 32 that extends downwardly from a top surface. A similar rear slot 34 is located on the side panel 18 near the rear panel 16 that also extends downwardly from the top surface of the side panel 18. Side panel 18 also includes a reinforced region 36 that supports a second mechanism pin 38. Like mechanism pin 30, mechanism pin 38 may have a head that is larger than a base portion, forming a space between the head and the surface of the reinforced region 36. Each side panel 18 also has a mounting hole 40 formed therein near the bottom, and close to the front stiffening flange 20.

The chassis plates 14 are coupled together with a front tube 42 and a rear tube 44. Tubes 42 and 44 are preferably welded to the chassis plates 14, and can specifically include welds to the front stiffening flanges 20 and the rear panels 16. As best seen in FIG. 1, a clevis-type motor mount 45 is rigidly coupled to the rear tube 44, such as by welding. The assembly of the chassis plates 14, the front tube 42, and the rear tube 44 are supported above an underlying support surface through adjustable leg assemblies 46. Front leg assemblies 46 include a front mounting bracket 48 that is welded to the front tube 42 (and possibly the lower surface of chassis plate 14). The front mounting bracket 48, in one embodiment, includes a threaded nut 50 that is welded to a top surface of the front mounting bracket 48. A support leg 52 is threaded through a hole in the mounting bracket 48 (not shown) and through the nut 50. The support leg 52 is rigidly or pivotably coupled to a foot 54 designed to rest on the underlying support surface. As best seen in FIG. 3, foot 54 may include a hole 56 to secure the foot 54 to the floor, such as with a bolt or other securing mechanism. Similarly, back leg assemblies 46 include a back mounting bracket 58 that is welded to the rear tube 44 (and possibly the lower surface of chassis plate 14). The back mounting bracket 58, in one embodiment, includes a threaded nut 60 that is welded to a top surface of the back mounting bracket 58. A support leg 62 is threaded through a hole in the mounting bracket 58 (not shown) and through the nut 60. The support leg 62 is rigidly or pivotably coupled to a foot 64 designed to rest on the underlying support surface. As best seen in FIG. 3, foot 64 may include a hole 66 to secure the foot 64 to the floor, such as with a bolt or other securing mechanism. The length of any leg 52 or 62 may be adjusted by threading, or unthreading, the legs 52, 62 through a corresponding nut 50, 60. This allows the base assembly 12 to be leveled, even if the underlying support surface is uneven. The feet 54 and support legs 52 are rearwardly located relative to the front surface of arms 68 making it less likely the feet 54 or legs 52 would present a tripping hazard. If adjustment is not needed, or desired, the adjustable leg assemblies 46 can be replaced with fixed length legs as well, such as those shown in FIGS. 4-17, labeled as 82 in FIG. 5.

As shown in FIG. 1, a row of seating may be formed by coupling an arm 68 to the base assembly 12. More specifically, the arm 68 may bridge two side-by-side base assemblies 12, and couple them together. A lower panel 70 of each arm, in some embodiments, rests on the front mounting bracket 48 and back mounting bracket 58, and extends between the support legs 52, 62 and the chassis plates 14. As best seen in FIG. 3, each lower panel 70 also has a front locating pin 72 and a rear locating pin 74. Front locating pin 72 is located to engage front slot 32, and rear locating pin 74 is located to engage rear slot 34. This allows each arm 68 to be easily installed on the base assembly 12 by inserting the locating pins 72, 74 in corresponding slots 32, 34. Once in place, the arms can be locked in placed with one bolt, through mounting hole 40 and into the lower panel 70 of arm 68. Each arm 68 can accommodate wiring and buttons or other mechanisms to operate movement of the seat (described below), and so is shown with exemplary holes 76 in the arm 68. Should any individual arm become damaged, worn, or otherwise need replacement, the arm 68 in question can be easily removed and replaced, by simply removing the bolts extending through mounting hole 40 (on each side) (and disconnecting any wiring) and lifting the arm to disengage the locating pins 72, 74 from the slots 32, 34. A new arm can then be easily reinstalled.

A back panel 78 is also easily installed on base assembly 12. The back panel 78 has a pair of locating pins 80 on each side that engage the corresponding keyhole slot 22 and top slot 24 on the rear panels 16. The back panel 78 is thus easily removable (for access or repairs) by lifting the back panel 78 to disengage pins 80 from the slots 22, 24.

Figure 11:
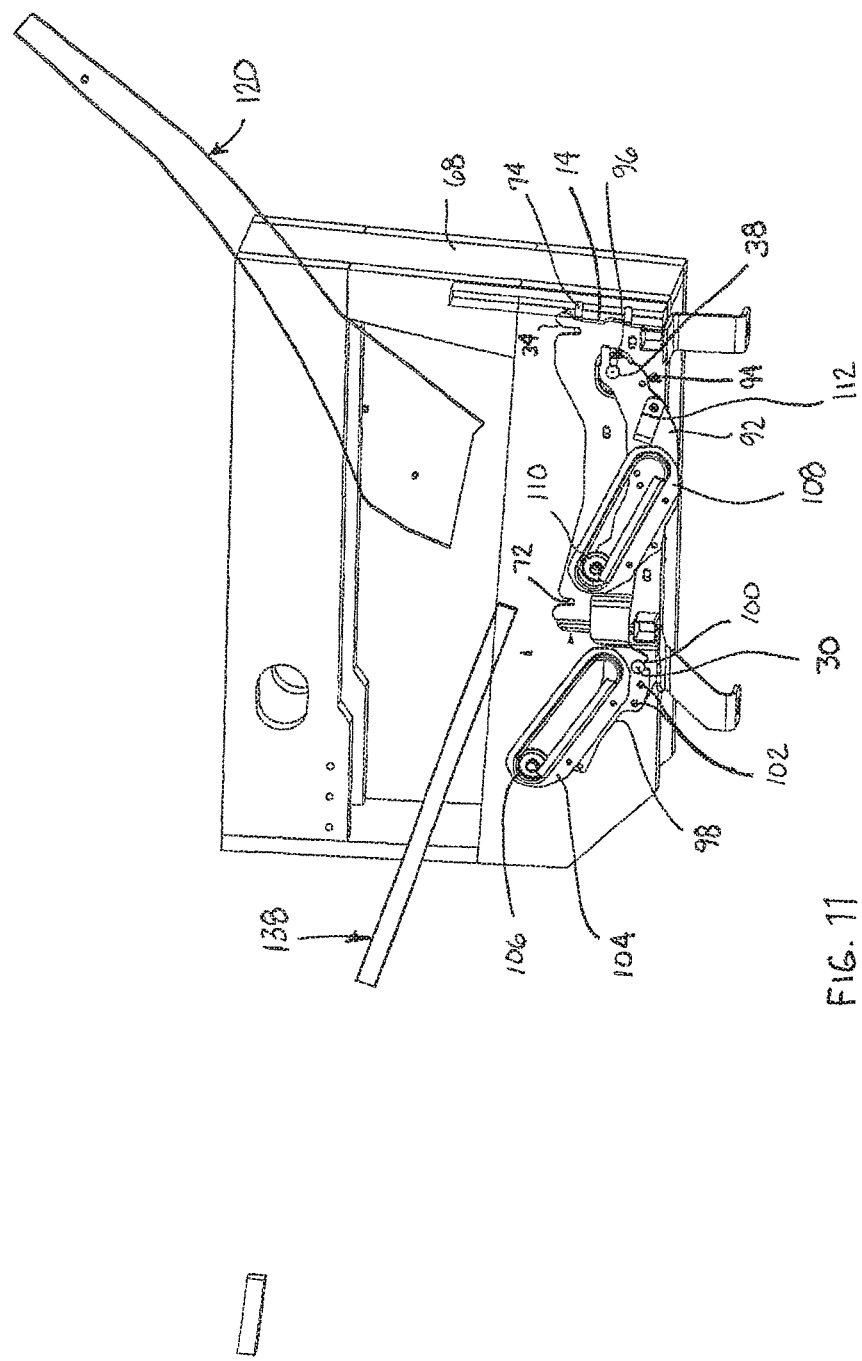

A mechanism 90 is easily installable on the base assembly 12 that moves a seating unit between upright (FIG. 4), extended (FIG. 6), and fully reclined (FIG. 7) positions. More specifically, as best seen in FIG. 11, mechanism 90 includes a base plate 92 that generally carries and supports the remainder of the components and links of mechanism 90. As best seen in FIG. 11, to mate with the base assembly 12, base plate 92 includes an extended rear end 94 with a slot 96. In some embodiments, slot 96 extends generally horizontally. Base plate 92 also includes an extended front end 98. Front end 98 includes a slot 100. In at least some embodiments, slot 100 extends vertically. Front end 98 also includes mounting holes 102. As shown, in some embodiments, multiple mounting holes 102 are shown. The mechanism 90 is easily installable on the base assembly 12 by sliding mechanism pins 38 (on the chassis plates 14) into corresponding slots 96 at the rear end 94 of base plates 92. At this point, the front end of the mechanism 90 can be lowered, such that the slots 100 on the front end 98 of base plate 92 engage the corresponding mechanism pins 30 on the front mechanism brackets 26. Once in place, gravity will maintain the position of mechanism 90 on the chassis plates 14. The mechanism 90 can be further secured with one bolt (on each side) extending through a selected mounting hole 102 (on base plate 92) and a selected mounting hole 28 in front mechanism bracket 26.

Figure 13:
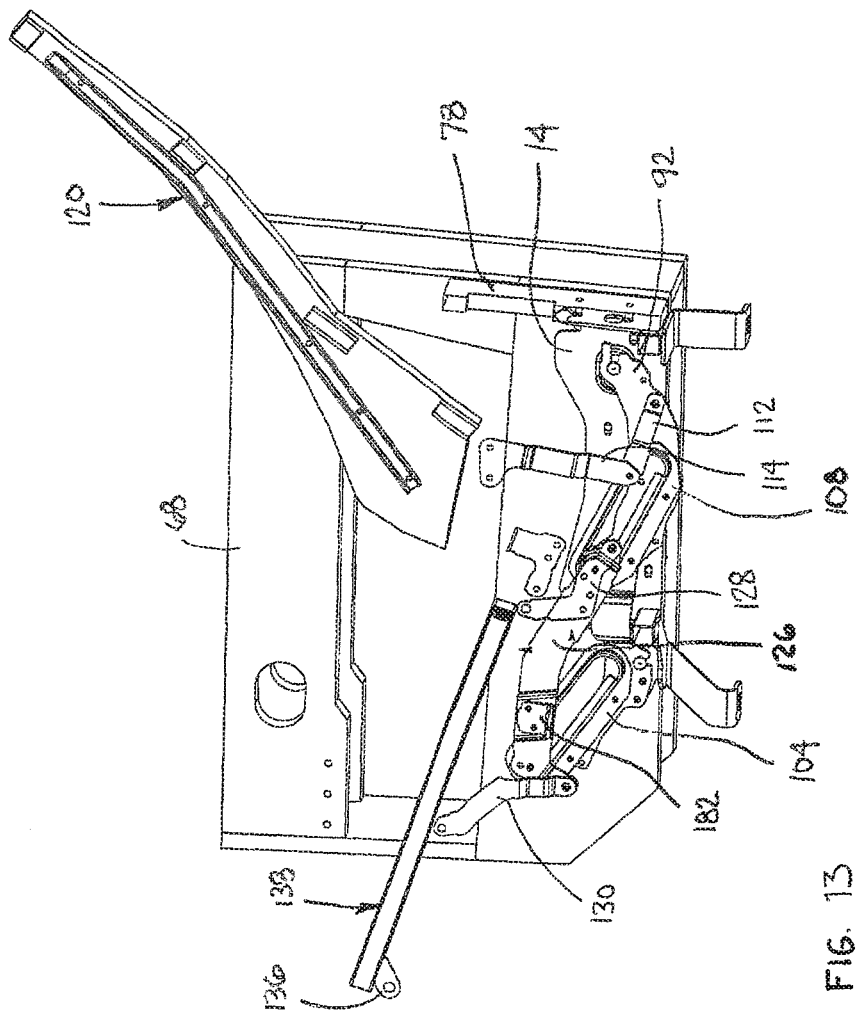
Figure 14:
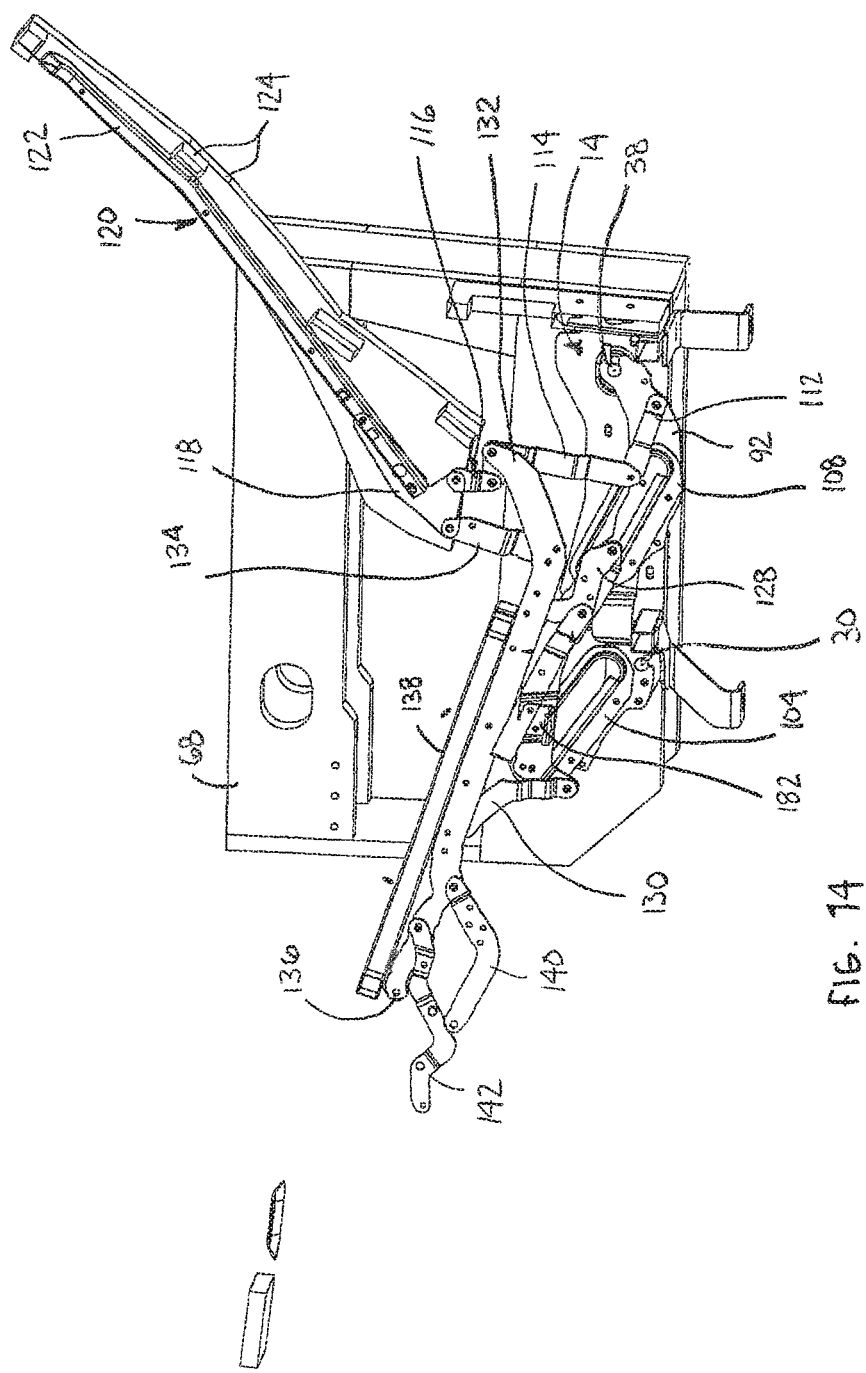

With continued reference to FIG. 11, base plate 92 carries a front track 104 having a front roller 106, and a rear track 108 having a rear roller 110. In at least one embodiment, tracks 104, 108 are rigidly coupled directly to base plate 92, such as by riveting, bolting, or welding. In some embodiments, it is desirable to change the pitch of the seat as the seating unit moves from the closed position to the extended position. To accomplish this seat pitch change, the front track 104 has a slightly greater incline than the rear track 108. This seat pitch change continues from the extended position to the fully reclined position, which may be preferred in commercial environments (theaters) to minimize the space required to move to the fully reclined position (because as the seating unit is reclining, the seat pitch is changing, instead of the seat merely moving forward, which would require more space from front to back). A back toggle link 112 (shown partially in FIG. 11, and best seen in FIG. 12) is also pivotably coupled to the rear end 94 of base plate 92. As best seen in FIG. 13, the upper end of back toggle link 112 is pivotably coupled to a lower end of a rear bell crank 114. As seen in FIG. 14, the opposite end of the rear bell crank 114 is pivotably coupled to a back drive link 116. The opposite end of the back drive link 116 is coupled to a back mounting link 118. Back mounting link 118 couples a back 120 to the seating unit. Back 120, in at least some embodiments, is a slim-profile design, having a welded tubular steel frame 122 that reinforces a wooden frame 124. The back 120 is designed to be easily removable from the back mounting link 118.

Figure 5:
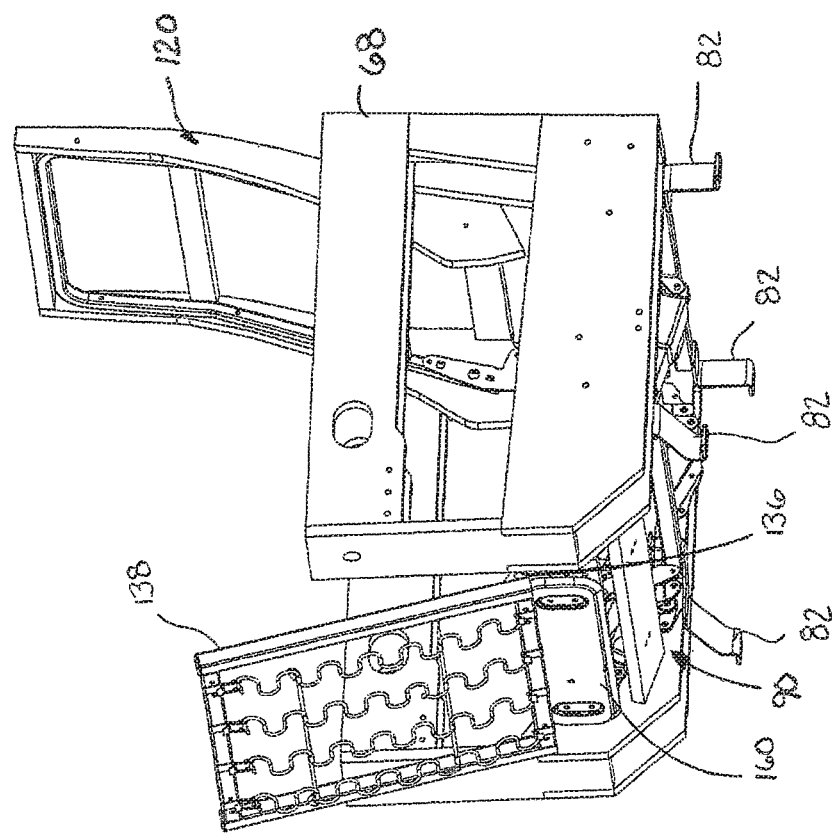
FIG. 5 is the same view as FIG. 4, but showing the seat frame pivoted upwardly.
Figure 12:
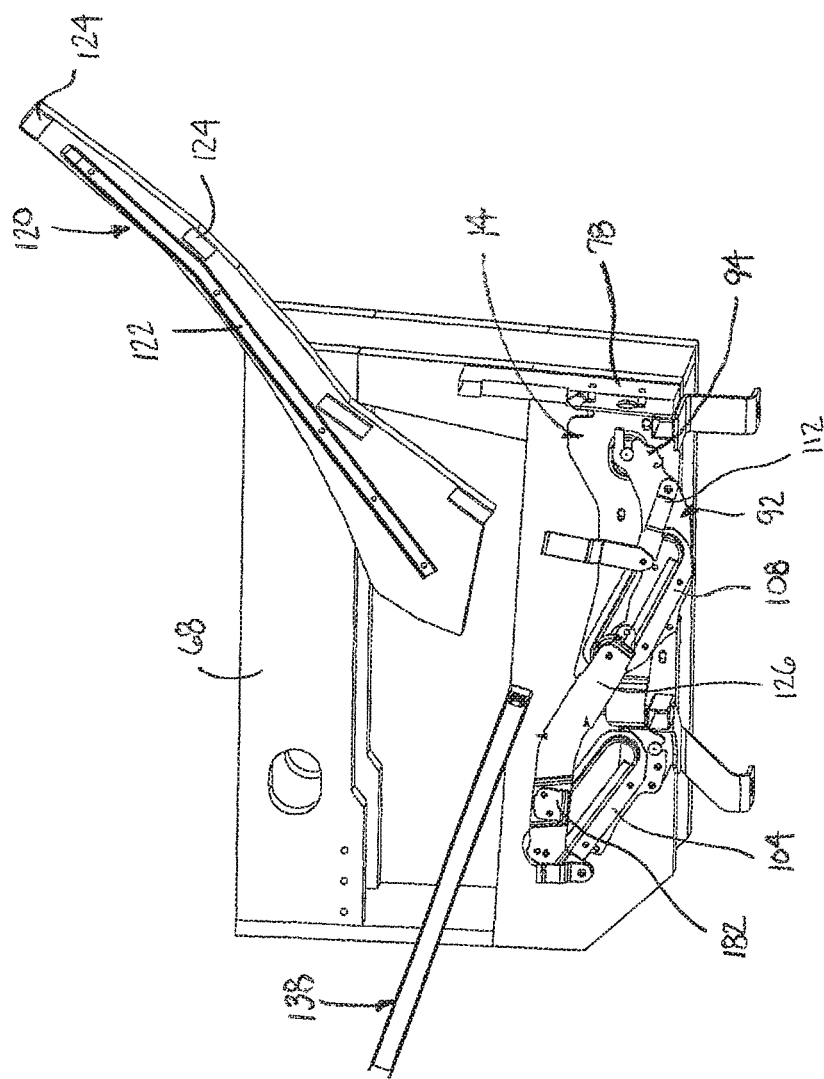

As best seen in FIG. 12, a roller link 126 is coupled to the front roller 106 and the rear roller 110. As shown in FIG. 13, rear pivot link 128 is pivotably coupled to the rear end of the roller link 126, and a front pivot link 130 is pivotably coupled to the front end of the roller link 126. As best seen in FIG. 14, the opposite end of the rear pivot link 128 is pivotably coupled to a seat mounting plate 132. Similarly, the opposite end of the front pivot link 130 is also pivotably coupled to the seat mounting plate 132. As best seen in FIG. 14, the seat mounting plate 132 has a rearward end that is pivotably coupled to the rear bell crank 114. Near the rearward end of the seat mounting plate 132, a rear seat bracket 134 is rigidly coupled on one end to the seat mounting plate 132, and is pivotably coupled on the other end to the back mounting link 118. The seat mounting plate 132 extends forwardly to a seat mount pivot 136. Seat mount pivot 136 pivotably couples a front end of a seat frame 138 to the mechanism 90. The seat frame 138 can be made, for example, from welded steel tubing. The rear end of the seat frame 138 rests on the seat mounting plate 132. This pivotal connection of the seat frame 138, at only the front end of the seat frame 138, allows the seat frame 138 to be rotated upwardly, allowing access to the components under the seat frame 138 (or generally any access under the seat frame 138). FIG. 5 shows the rear end of seat frame 138 rotated upwardly away from the seat mounting plate 132.

Figure 10:
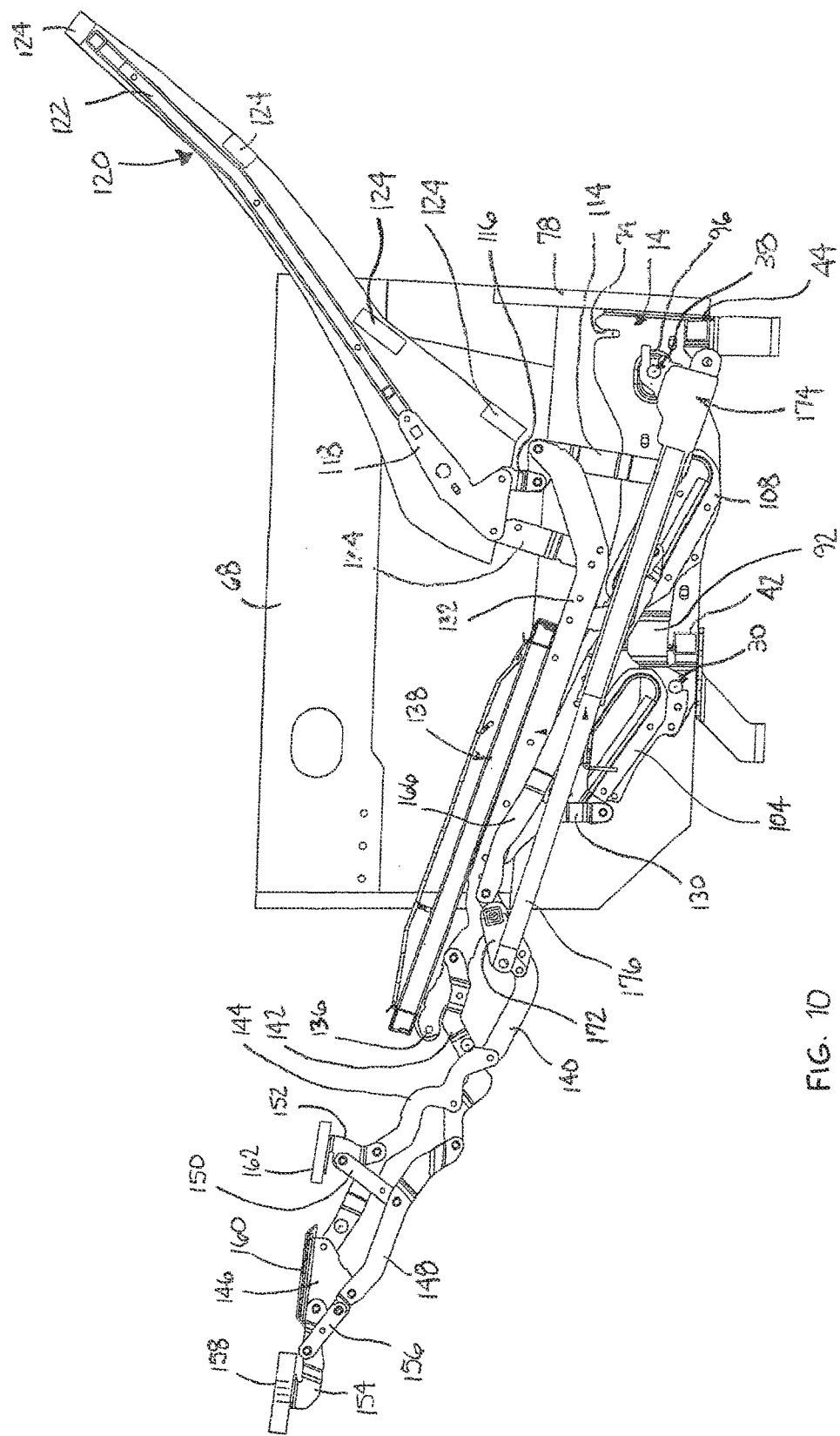
FIG. 10 is a cross-section through the center of FIG. 7.
Figure 15:
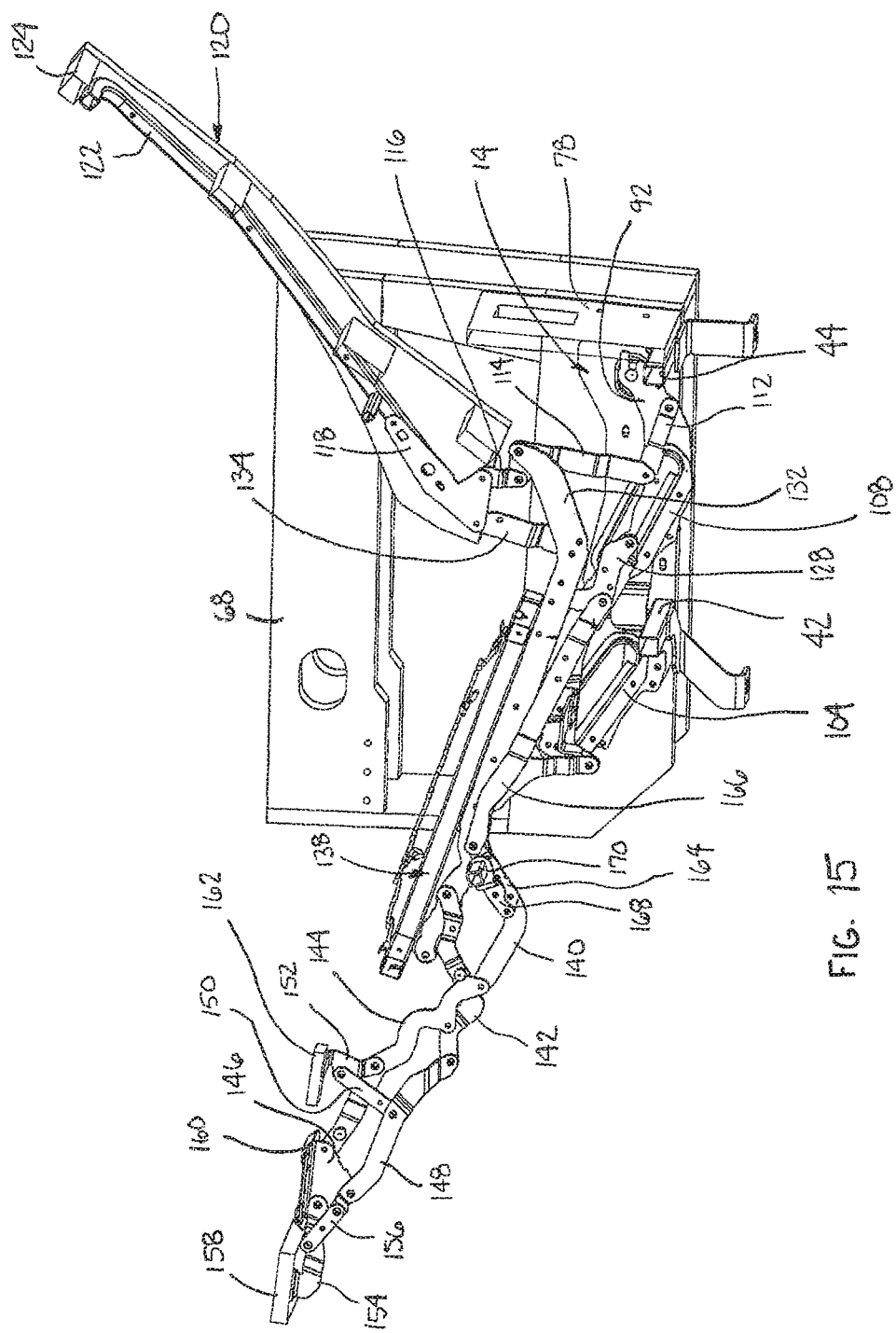

As best seen in FIG. 14, the front end of seat mounting plate 132 also has a rear ottoman link 140 pivotably coupled to seat mounting plate 132. Similarly, a front ottoman link 142 is also pivotably coupled to the seat mounting plate 132 forwardly of the rear ottoman link 140. As best seen in FIG. 15, the end of rear ottoman link 140, opposite the seat mounting plate 132 connection, is pivotably coupled to a main ottoman link 144. The main ottoman link 144 is also pivotably coupled to the front ottoman link 142. The outermost end of the main ottoman link 144 is pivotably coupled to a footrest bracket 146. A lower end of the footrest bracket 146 is pivotably coupled to a second ottoman link 148. The second ottoman link 148 has an opposite end that is pivotably coupled to the front ottoman link 142. Generally midway along the second ottoman link 148, a mid-ottoman control link 150 is pivotably coupled to the second ottoman link 148. The end of mid-ottoman control link 150 opposite the connection to the second ottoman link 148 is pivotably coupled to a mid-ottoman bracket 152. The mid-ottoman bracket 152 is also pivotably coupled to the main ottoman link 144. Returning to the footrest bracket 146, a flipper ottoman bracket 154 is pivotably coupled to a forward end of the footrest bracket 146. A flipper control link 156 is pivotably connected on one end to the flipper ottoman bracket 154, and is pivotably coupled on the other end to the outer end of the second ottoman link 148. As best seen in FIG. 10, a footrest 158 is coupled to the flipper ottoman bracket 154, a footrest 160 is coupled to the footrest bracket 146, and a mid-ottoman 162 is coupled to the mid-ottoman bracket 152. In some embodiments, the seating unit may be designed with a continuous chaise pad that covers the footrest 158, the footrest 160, and the mid-ottoman 162. To allow this chaise pad to move more freely, in some embodiments, the footrest 160 is a low-profile, formed metal plate.

Figure 16:
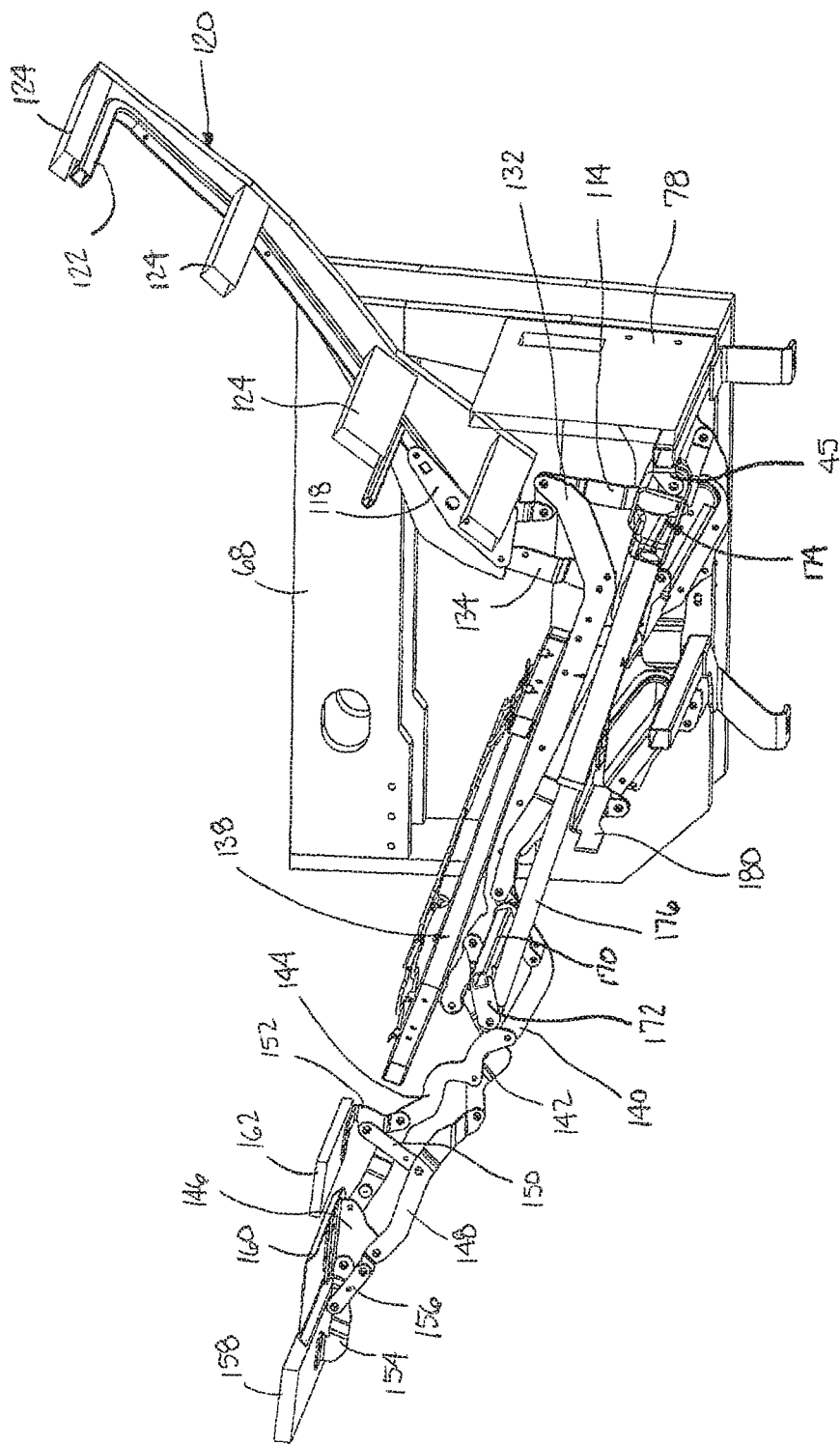
Figure 12:
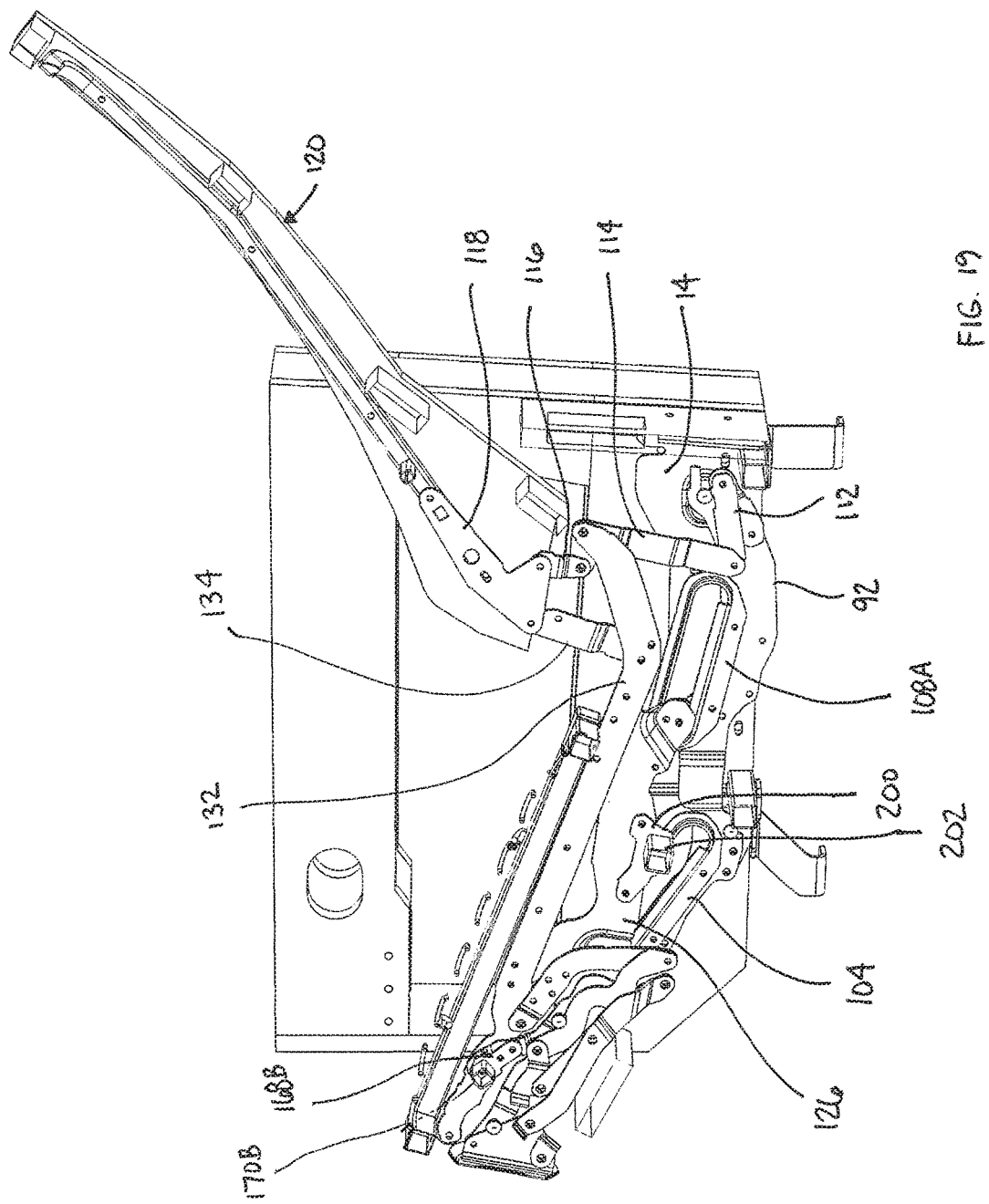

Returning to FIG. 15, a secondary rear ottoman link 164 is rigidly coupled on one end to the rear ottoman link 140. The other end of secondary rear ottoman link 164 is pivotably coupled to a footrest drive link 166. Footrest drive link 166 extends rearwardly from secondary rear ottoman link 164, and is pivotably coupled on a rear end to the rear pivot link 128. A motor tube bracket 168 is rigidly coupled to the secondary rear ottoman link 164 on one end, with the other end rigidly coupled to a motor tube 170 that extends from one side of mechanism 90 to an opposite, mirror-image side (there are mirror-image side assemblies, as described above, forming a left and a right side assembly for each mechanism 90). As best seen in FIG. 16, generally midway along motor tube 170, a clevis-type mount 172 is rigidly coupled to the motor tube 170. Mount 172 is used to pivotably couple a shaft 176 of a motor 174 to the motor tube 170. The opposite end of motor 174 is pivotably coupled to motor mount 45 on rear tube 44.

Figure 4:
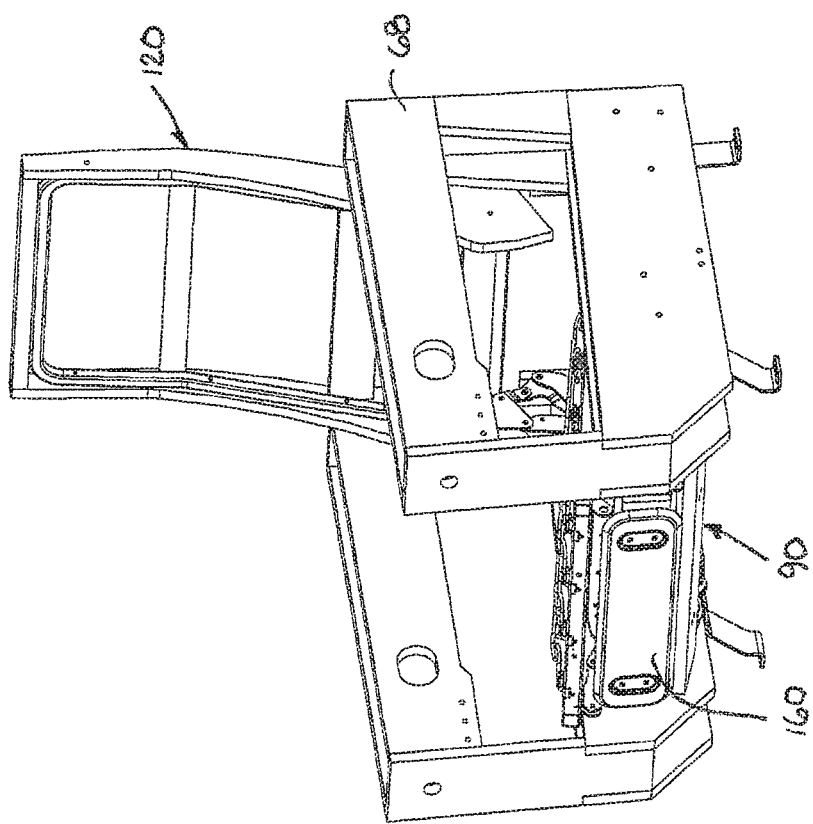
FIG. 4 is a perspective view of one unit of the seating assembly (instead of a row, for clarity), shown in the closed position.
Figure 6:
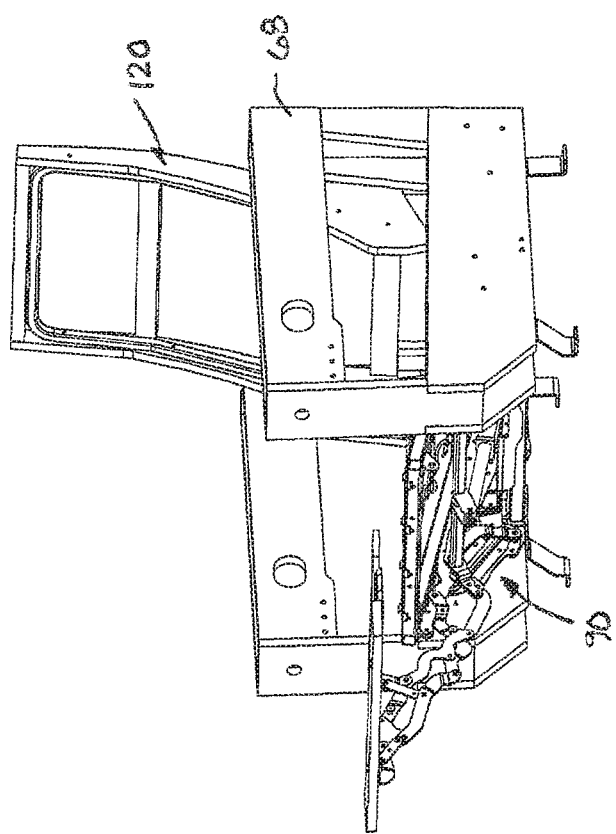
FIG. 6 is a view similar to FIG. 4, but showing the extended position, and showing only the right-hand side of the mechanism, as viewed from someone sitting in the seating unit.
Figure 7:
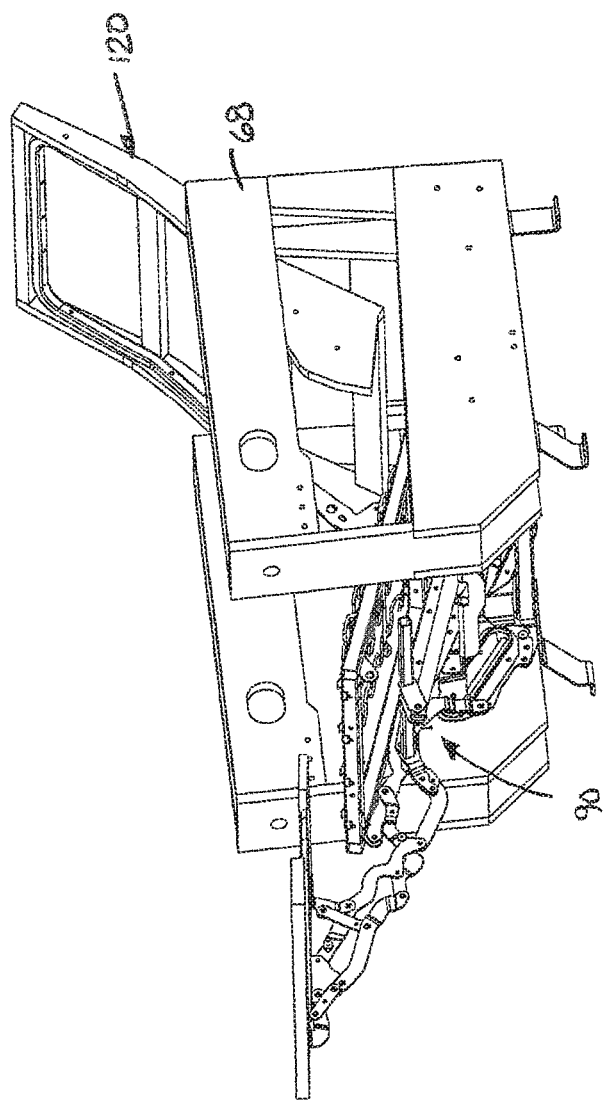
FIG. 7 is a view similar to FIG. 6, but showing the fully reclined position.
Figure 8:
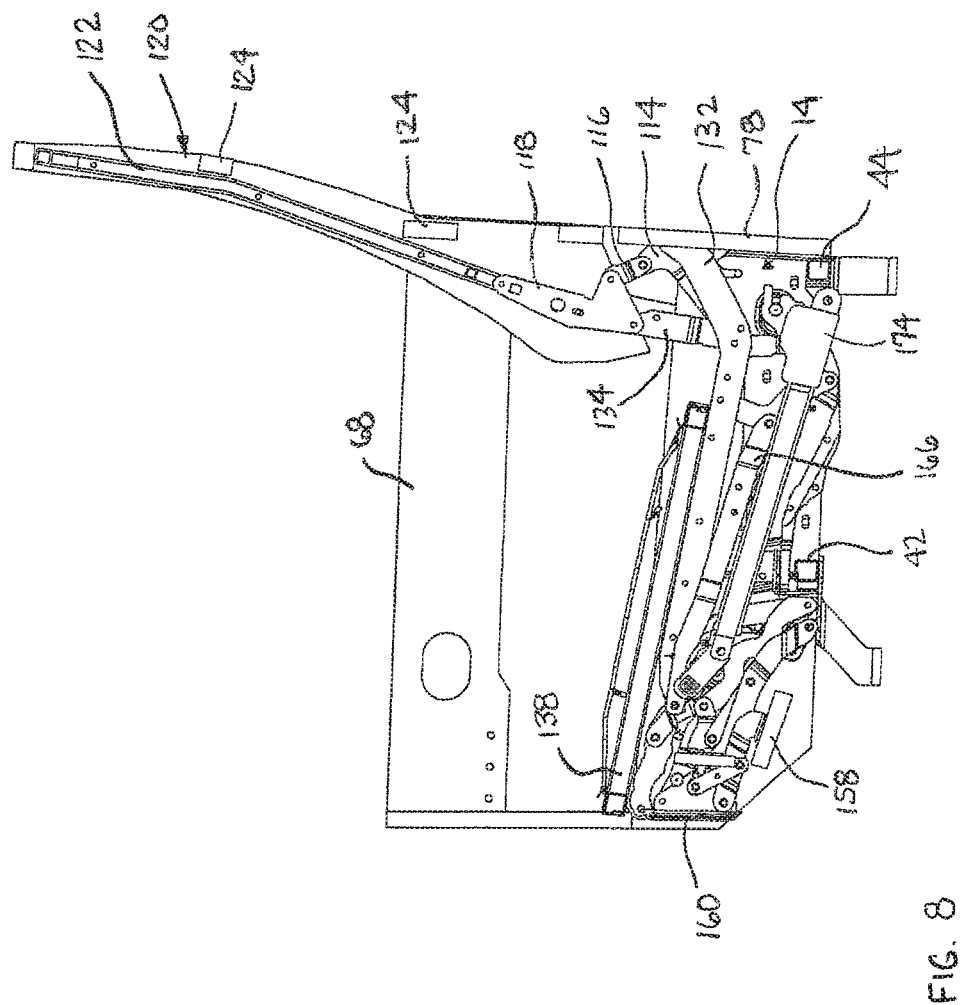
FIG. 8 is a cross-section through the center of FIG. 4.
Figure 9:
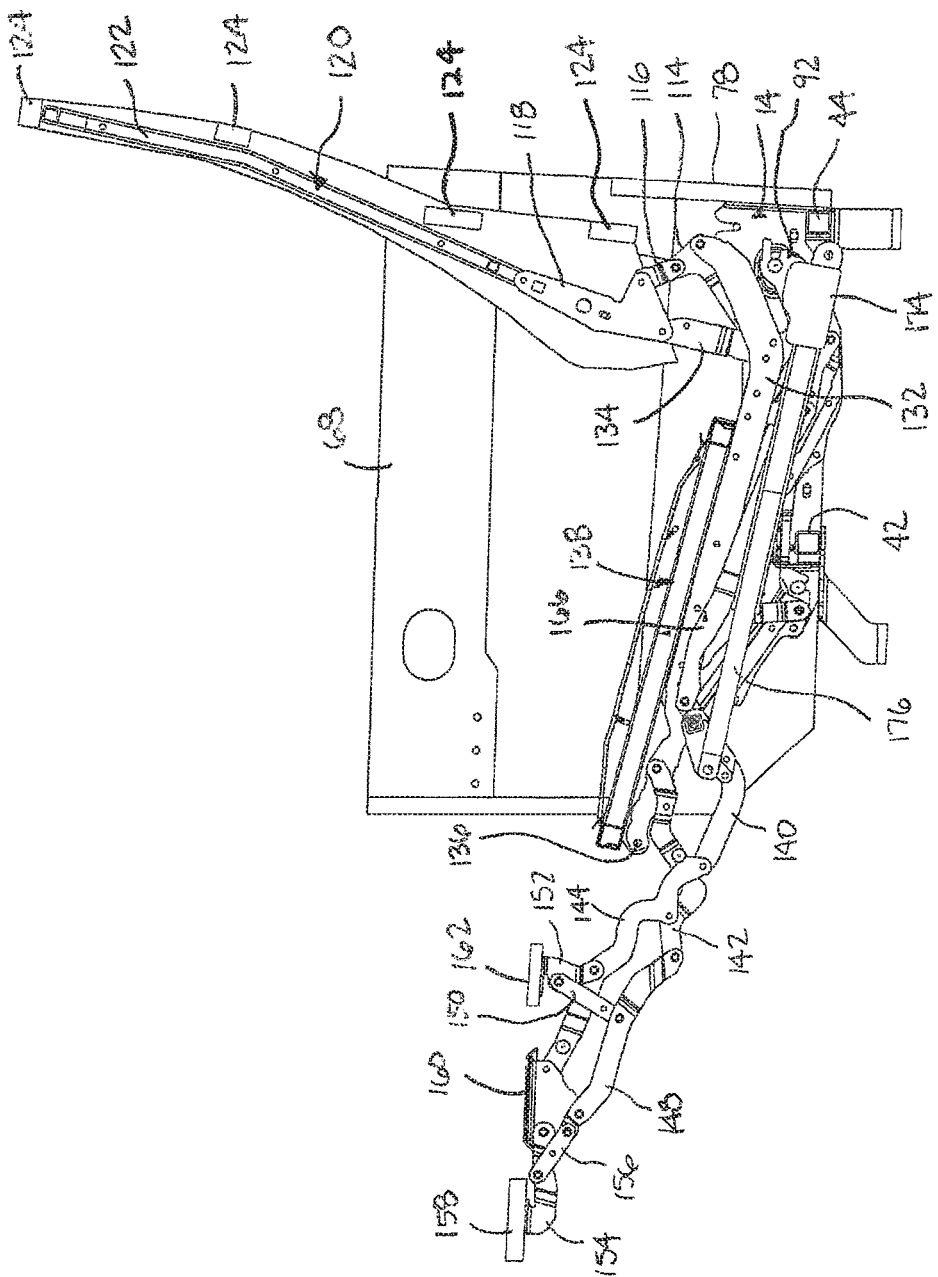
FIG. 9 is a cross-section through the center of FIG. 6.

The motor 174 is operated to extend and retract shaft 176 to move the mechanism 90 (and thus the seating unit) from the closed position of FIG. 4, to the extended position of FIG. 6, and to the fully reclined position of FIG. 7, and vice versa. The motor 174 is operable by a user-activated control, which may be located in the arm 68, in some embodiments. The motor 174 can also be stopped in any position between closed and fully reclined if desired by the user.

In some embodiments, a stabilizer bar 180 (FIG. 17) may be rigidly secured to roller link 126 through a stabilizer bracket 182 (FIG. 13). The stabilizer bar 180 thus extends from one side of mechanism 90 to the other and, as the name implies, offers additional stability to the mechanism 90.

In an additional aspect, a two motor version is shown and described with respect to FIGS. 18-22, as opposed to the single motor version described above. This additional aspect allows independent operation of the back recline and the footrest. Additionally, in this aspect, the angle of the rear track is slightly lessened to increase the seat pitch as the back reclines.

In the additional aspect shown in FIGS. 18-22, many of the components remain the same as those described above with respect to FIGS. 1-17. When components remain the same, they are similarly numbered and configured, and so will not be further described with reference to FIGS. 18-22 for the sake of brevity.

As best seen in FIG. 18, in this aspect, an additional recline bracket 200 is coupled to the roller link 126. The recline bracket 200 is, in turn, coupled to a recline motor tube 202 that extends between corresponding recline brackets 200 (one recline bracket 200 being on each side of welded base assembly 12. Still referring to FIG. 18, it can be seen that the rear track 108A is coupled to base plate 92 in an orientation such that the track is flatter, or with a smaller upward angle, as compared to rear track 108 described above. By keeping the same angular orientation of front track 104, and decreasing the angle of the rear track 108A, the pitch of the seat frame 138 is increased as the back 120 reclines. As best seen in FIG. 20, a recline motor 174A is coupled at a rear end to rear tube 44 with a motor mount 45. The recline motor 174A has an extendable shaft that is coupled to recline motor tube 202 with a mid-motor bracket 204.

The recline motor 174A is operable to independently recline the back 120, without necessarily extending the footrest 158. With the extendable shaft of recline motor 174A in a retracted position, the back 120 is in an upright orientation, as shown in FIG. 18. As the extendable shaft of recline motor 174A extends, the shaft drives recline motor tube 202 forwardly, and correspondingly drives recline bracket 200, and roller link 126 forwardly. This motion reclines the back 120 to the position shown in FIGS. 19 and 20. It can be seen, therefore, that the back 120 can be reclined independently from the footrest 158, such that the back 120 can be reclined without extending the footrest 158.

Figure 21:
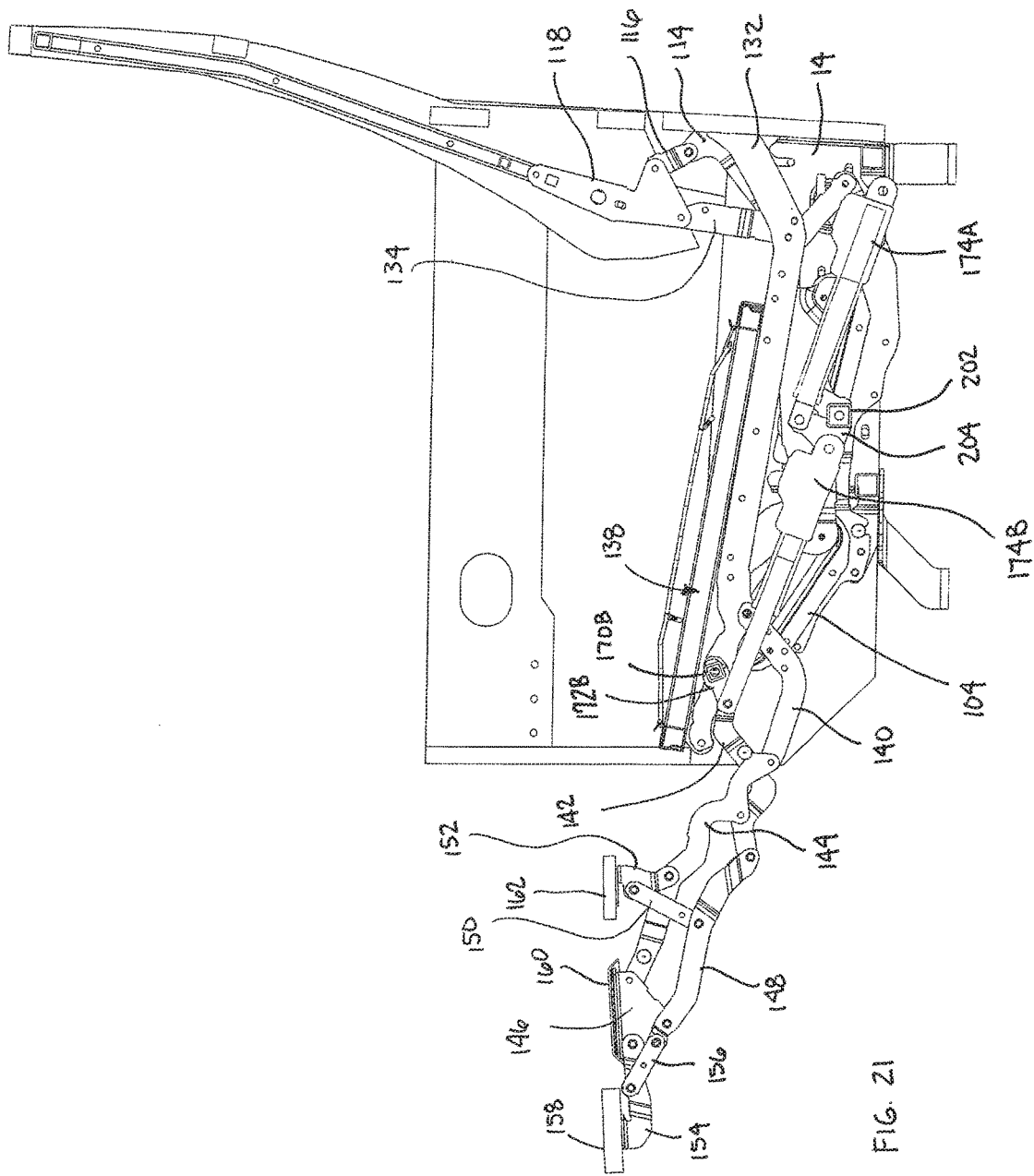
FIG. 21 is a view similar to 20, but showing the footrest extended and the back in an upright condition.

As can be seen in FIG. 20, a footrest motor 174B is coupled on a rear end to mid-motor bracket 204. The footrest motor 174B also has an extendable shaft. The extendable shaft of the footrest motor 174B is coupled on a forward end to a footrest motor tube 170B with a clevis bracket 172B. The footrest motor tube 170B is coupled to a motor tube bracket 168B. As best seen in FIG. 21, the motor tube bracket 168B is coupled to the front ottoman link 142. This differs slightly from the aspect described above with respect to FIGS. 1-18, in that the motor 174 of FIGS. 1-18 is coupled to the secondary rear ottoman link 164 (instead of the front ottoman link 142 as in this aspect). The footrest motor 174 is operable to move the footrest 158 from the closed position shown in FIG. 18, to an extended position as shown in FIG. 21. As shown in FIG. 21, the footrest 158 can be extended independently from the back 120, such that the back 120 can remain in an upright orientation when the footrest 158 is extended.

Figure 22:
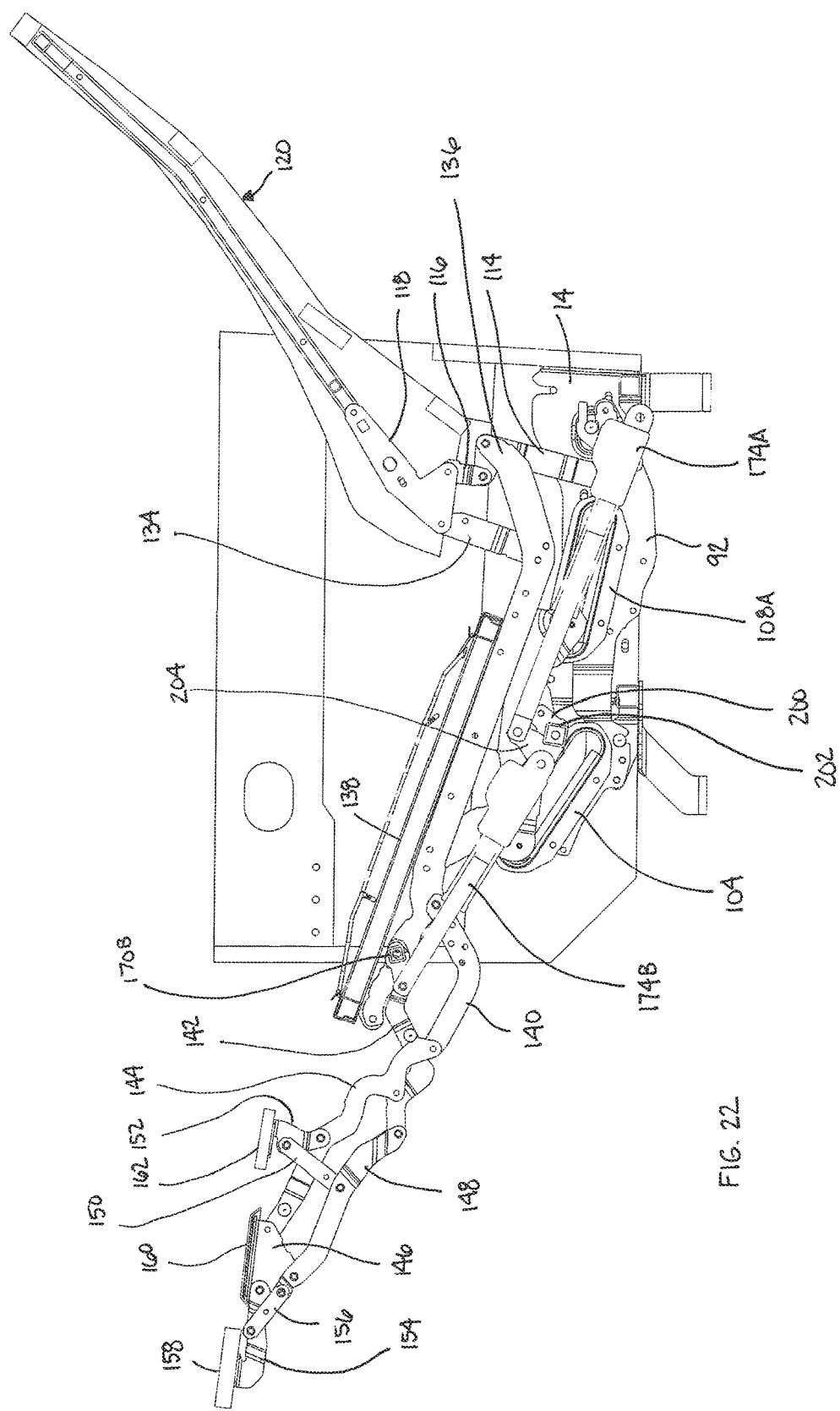
FIG. 22 is a view similar to FIG. 21, but now showing the back in a fully-reclined position.

While the back 120 and footrest 158 are independently operable with motors 174A and 174B, respectively, both motors 174A and 174B may be operated to move the chair to a fully-reclined position, as shown in FIG. 22.

From the foregoing, it will be seen that this invention is one well adapted to attain all the ends and objects hereinabove set forth together with other advantages, which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The invention claimed is:

1. A modular assembly for a row of high leg seating units, comprising:
   a frame defined by a pair of spaced apart chassis plates, coupled together in spaced relation by a pair of cross members;
   a plurality of legs coupled to the frame, and supporting the frame above an underlying surface on which the seating unit rests; and
   a reclining mechanism having a pair of spaced apart base plates, each with at least a forward and a rearward slot, the reclining mechanism coupled to a pair of independently operable motors,
   wherein the chassis plates each have a side panel having a top surface, the top surface having a pair of slots extending downwardly from the top surface and into the side panel.

2. The assembly of claim 1, further comprising at least one arm, said arm having locating pins, sized and located on said arms to correspond with said pair of slots on the side panel of the chassis plate, wherein said pins locate said arm relative to the frame, and at least partially support said arm on the chassis plate.

3. The assembly of claim 2, wherein the chassis plates have at least one mounting hole extending through said side panels, said mounting hole located and adapted to receive a bolt extending through the mounting hole and into an adjacent area of said arm, thereby coupling said arm to said chassis plate.

4. The assembly of claim 2, wherein the side panels of the chassis plates have a front end and a rear end, and wherein the chassis plates further comprise a rear panel extending orthogonally toward the opposing chassis plate from the rear end of the side panel, said rear panels each including at least one locating slot formed therein.

5. The assembly of claim 4, further comprising a back panel having a pair of locating pins sized and located to correspond with said locating slots on said rear panels of the chassis plates, said pins allowing said back panel to be located with respect to said frame.

6. The assembly of claim 5, wherein said locating slots are formed as keyhole slots, and wherein the back panel locating pins are adapted to mate with said keyhole slots such that the back panel locating pins locate and hold the back panel in place relative to the chassis plates.

7. The assembly of claim 1, wherein the side panels of the chassis plates have a pair of mechanism locating pins protruding inwardly toward the opposing chassis plate, and wherein the forward and rearward slots of the reclining mechanism correspond in size and location to mate with the mechanism locating pins on the chassis plates.

8. The assembly of claim 7, wherein the forward slot on the reclining mechanism is oriented vertically with an open end facing downwardly, and wherein the rearward slot on the reclining mechanism is oriented horizontally with the open end facing rearwardly.

9. The assembly of claim 8, wherein the rearward mechanism locating pin on the chassis is surrounded by a reinforced region on the chassis plate.

10. The assembly of claim 1, wherein the legs are adjustable in length.

11. The assembly of claim 9, wherein the reclining mechanism includes a back mounting link and wherein one of the motors is operable to move the back mounting link from a generally upright orientation to a reclined orientation.

12. The assembly of claim 11, wherein the reclining mechanism includes a footrest, and wherein the other of said motors is operable to move the footrest from a closed position to an extended position.

13. A modular assembly for a row of high leg seating units, comprising:
- a frame defined by a pair of spaced apart chassis plates, coupled together in spaced relation by a pair of cross members;
- a plurality of legs coupled to the frame, and supporting the frame above an underlying surface on which the seating unit rests; and
- a reclining mechanism having a pair of spaced apart base plates, each with at least a forward and a rearward slot, the reclining mechanism coupled to one or more independently operable motors,
- wherein the chassis plates each have a side panel having a top surface, the top surface having a pair of slots extending downwardly from the top surface and into the side panel.

14. The assembly of claim 13, wherein the side panels of the chassis plates have a pair of mechanism locating pins protruding inwardly toward the opposing chassis plate, and wherein the forward and rearward slots correspond in size and location to mate with the mechanism locating pins on the chassis plates.

15. The assembly of claim 13, wherein the reclining mechanism includes a back mounting link operable by one of the one or more motors to move the back mounting link from a generally upright orientation to a reclined orientation.

16. The assembly of claim 13, wherein the reclining mechanism includes a footrest operable by one of the one or more motors to move the footrest from a closed position to an extended position.

17. A modular assembly for a row of high leg seating units, comprising:
- a frame defined by a pair of spaced apart chassis plates, coupled together in spaced relation by a pair of cross members;
- a plurality of legs coupled to the frame, and supporting the frame above an underlying surface on which the seating unit rests;
- a reclining mechanism having a pair of spaced apart base plates, each with at least a forward and a rearward slot; and
- a pair of independently operable motors coupled to the reclining mechanism,
- wherein the chassis plates each have a side panel having a top surface and a pair of mechanism locating pins, the top surface having a pair of slots extending downwardly from the top surface and into the side panel, the mechanism locating pins protruding inwardly toward the opposing chassis plate.

18. The assembly of claim 17, wherein the reclining mechanism includes a back mounting link operable by one of the one or more motors to move the back mounting link from a generally upright orientation to a reclined orientation.

19. The assembly of claim 17, wherein the reclining mechanism includes a footrest operable by one of the one or more motors to move the footrest from a closed position to an extended position.

20. The assembly of claim 17, further comprising at least one arm, said arm having locating pins, sized and located on said arms to correspond with said pair of slots on the side panel of the chassis plate, wherein said pins locate said arm relative to the frame, and at least partially support said arm on the chassis plate.

* * * * *